United States Patent [19]

Harbach

[11] Patent Number: 5,893,262

[45] Date of Patent: Apr. 13, 1999

[54] MATERIAL AERATING AND MIXING MACHINE

[75] Inventor: Terry Harbach, Delhi, Iowa

[73] Assignee: ATI Global, Inc., Delhi, Iowa

[21] Appl. No.: 08/826,848

[22] Filed: Apr. 10, 1997

[51] Int. Cl.$^6$ .................... A01D 67/00; A01D 87/04
[52] U.S. Cl. .................... 56/208; 56/228; 56/351; 56/370; 198/369.5; 414/505; 414/523
[58] Field of Search .................... 56/192, 208, 218, 56/228, 350, 351, 370, 355, 372; 198/369.5, 371.2, 587; 414/503, 504, 505, 523, 528

[56] References Cited

U.S. PATENT DOCUMENTS

| | | |
|---|---|---|
| 757,303 | 4/1904 | Hawkins . |
| 1,001,168 | 8/1911 | Roosa . |
| 1,085,161 | 1/1914 | Reip . |
| 1,273,312 | 7/1918 | Baum . |
| 1,725,939 | 8/1929 | Slice . |
| 2,195,381 | 3/1940 | Patterson . |
| 2,390,375 | 12/1945 | Kucera . |
| 2,419,824 | 4/1947 | Davis . |
| 2,507,635 | 5/1950 | James . |
| 2,629,223 | 2/1953 | Russell . |
| 2,999,348 | 9/1961 | Cunningham . |
| 3,496,713 | 2/1970 | Reinhardt . |
| 4,739,610 | 4/1988 | Schultz . |
| 4,777,788 | 10/1988 | Laquerre . |
| 4,932,196 | 6/1990 | Schnittjer . |
| 4,976,095 | 12/1990 | Schnittjer . |
| 5,316,431 | 5/1994 | Barber ................... 414/523 |
| 5,450,717 | 9/1995 | Delperdang et al. ........ 56/372 X |

FOREIGN PATENT DOCUMENTS 835359  6/1981  U.S.S.R. .

*Primary Examiner*—Heather Shackelford
*Attorney, Agent, or Firm*—James C. Nemmers

[57] ABSTRACT

A material aerating and mixing machine having a material elevator which elevates, mixes and aerates the material to be processed. The material from the elevator is discharged onto a pair of conveyors, a cross conveyor that can be side shifted for windrow turning, and a discharge conveyor that is pivotally mounted for swingable movement in a horizontal plane into a different positions, one position being in line with the cross conveyor for truck loading, another at an angle for stack turning, and a third position where the conveyor is folded for windrow turning or transport. Each of the conveyors is independently powered depending upon the mode in which the machine is operated.

8 Claims, 2 Drawing Sheets

MATERIAL AERATING AND MIXING MACHINE

BACKGROUND OF THE INVENTION

Because of increasing environmental concerns, the disposal and recycling of waste products has created a demand for more efficient ways of treating wastes for conversion into recycled products that have some commercial value. Therefore, composting is being used with increased frequency to convert waste of all types to valuable soil conditioners. Also, soil that has been contaminated by toxic substances must be removed, cleaned of the toxic material and replaced free of the contaminants. Machines are known and available for the bioremediation of soil and for windrowing disposed waste material into rows or stacks so as to allow the naturally occurring bacterial action to biologically digest the organic materials and convert the waste into a useful product. Since these are aerobic processes, the composted material or soil must be processed in order to introduce and trap oxygen in the material to provide for the proper bioremediation. The composted material or soil must be regularly and thoroughly mixed and aerated to allow the natural biological process to work. This bioremediation process will remove the toxic substances from the soil so that the soil can be replaced free of the contaminants. The process will also convert otherwise waste material into a stable and relatively odorless material which can be used as a soil conditioner.

A variety of machines are known and available for aerating and mixing soil or compost material that is either stored in stacks or windrows. Examples of such machines are shown in U.S. Pat. No. 4,932,196 entitled "Compost Windrow Turner" and U.S. Pat. No. 4,976,095 also entitled "Compost Windrow Turner". Machines shown in these two patents are excellent machines for processing contaminated soil or waste material stored in windrows by elevating and completely agitating and inverting the material and returning it to windrows. Other known machines utilize drums or high speed flails or knives that thrash through the stored material to pulverize it. Generally, the typical machine is designed to aerate either windrowed material or stacked material, but not both. Processors of contaminated soil or waste material will commonly use a windrowing machine or a stacking machine, but not both, because of the expense involved. There are situations, however, where a single user may wish to windrow some of the soil or waste material and stack other of the material. In such instances, there is a need for a single machine that can both aerate material in a windrow configuration or aerate material that is in a stacked configuration. It is also highly desirable that such a machine have the capability of loading the material into a truck or other carrier for transport to another site. Also, machines of this type must frequently be moved from one site to another, and it is desirable that such machines be compact for ease of transport with a minimum amount of loading and set-up time.

SUMMARY OF THE INVENTION

The material aerating and mixing machine of the invention is a self-propelled machine preferably having a track drive although the machine could be mounted on rubber tires and towed. The machine carries a material elevator which elevates, mixes and aerates the material to be processed. The machine includes a pair of conveyors, a cross conveyor that can be side shifted for windrow turning, and a discharge conveyor that is pivotally mounted for swingable movement in a horizontal plane into a different positions, one position being in line with the cross conveyor for truck loading, another at an angle for stack turning, and a third position where the conveyor is folded for windrow turning and transport. The machine of the invention thus utilizes two conveyors positionable in different modes for windrowing, stack turning, carrier loading or transport. The machine may be operated by a operator located in a cab on the machine or the machine may be controlled from a remote location.

DESCRIPTION OF THE PREFERRED EMBODIMENT OF THE INVENTION

Figure 1:
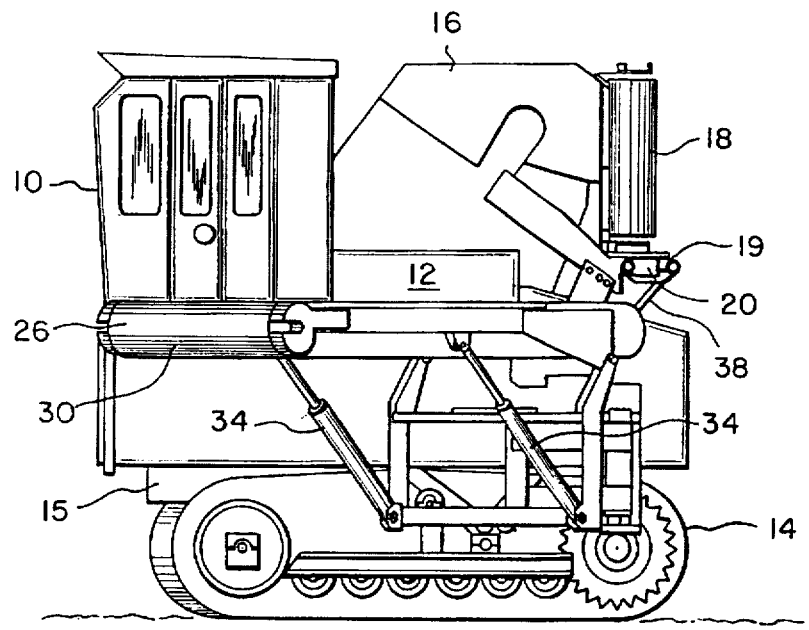
FIG. 1 is a side elevational view of the apparatus of the invention with the conveyors both shown in transport positions.
Figure 2:
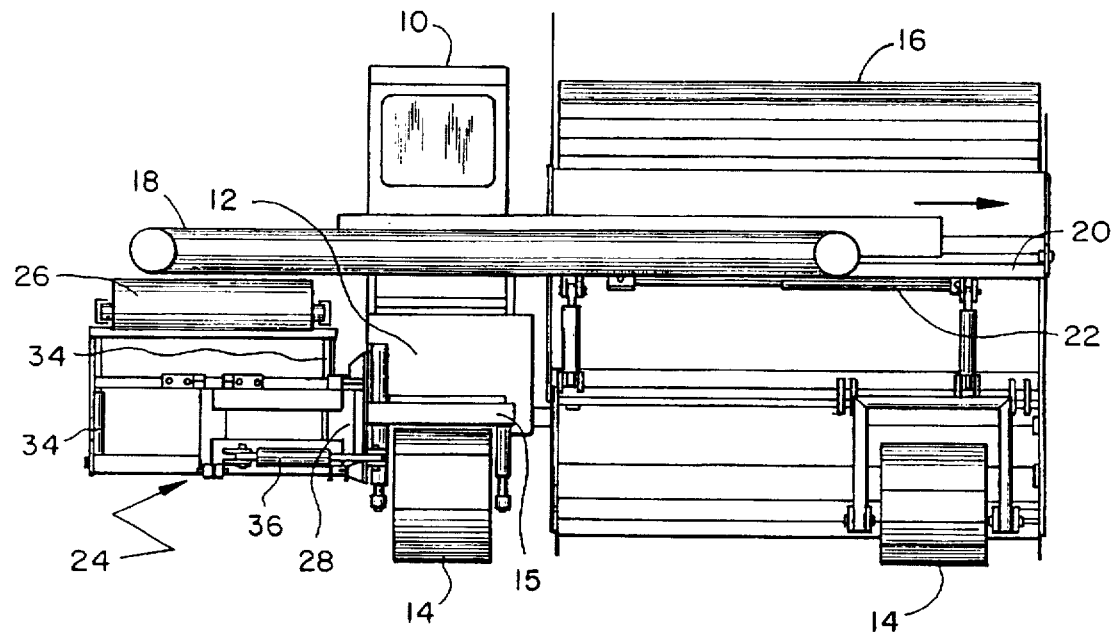
FIG. 2 is a rear view of the apparatus and showing the cross conveyor side shifted and the discharge conveyor positioned for windrow turning.

Referring first to FIGS. 1 and 2, there is shown the preferred embodiment of the apparatus of the invention which is a self-propelled windrow and stack turning unit having an operator's cab 10 positioned at the left front of the unit just ahead of an engine contained in the engine compartment 12. The engine powers a track drive 14 mounted to a main frame 15 in any suitable manner well known to those skilled in the art. If desired, the unit may be mounted on rubber tires (not shown) and be towed. The engine in compartment 12 is also used to power a hydraulic system (not shown) that in turn drives and controls an elevator conveyor 16 of any suitable type. An example of an elevator conveyor suitable for use in machines of this type is shown in U.S. Pat. No. 4,976,095. The hydraulic system also powers the other moveable components of the machine in the manner described hereinafter.

The soil or waste material to be turned is picked up, elevated, mixed and aerated by the elevator conveyor 16 which discharges the material onto a cross conveyor 18 mounted on the rear of the unit behind and beneath the elevator conveyor 16. Cross conveyor 18 is preferably an endless belt type conveyor of any suitable type, and the conveyor 18 is driven by a hydraulic motor (not shown) so that it can be driven in either direction. As best seen in FIG. 2, the cross conveyor 18 runs crosswise to the direction of movement of the machine and runs in a substantially horizontal plane. The cross conveyor is mounted on a suitable mounting structure 19 that includes a pivotally mounted guide track 20 that allows the cross conveyor 18 to be shifted to the left or right under power of hydraulic cylinder 22. As explained in more detail hereinafter, structure 19 also provides for moving the cross conveyor 18 into a folded position for transport.

Figure 3:
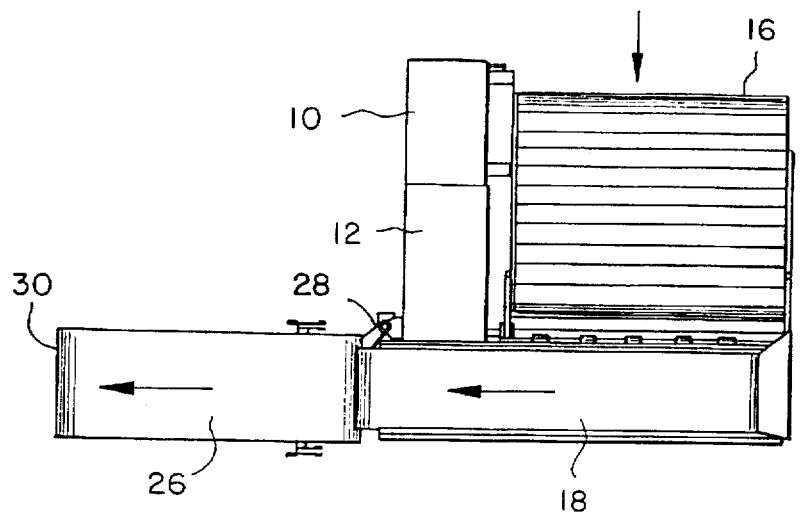
FIG. 3 is a top view showing the discharge conveyor positioned in line with the cross conveyor for carrier loading.
Figure 4:
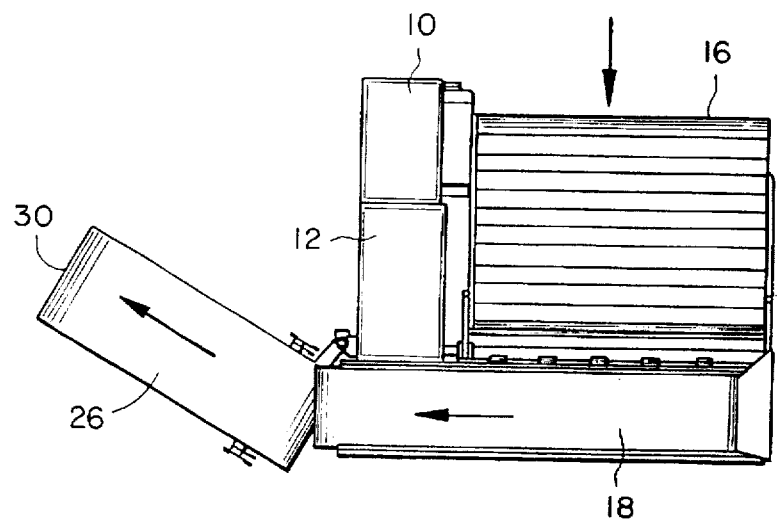
FIG. 4 is a top view showing the discharge conveyor positioned at an angle for stack turning.
Figure 5:
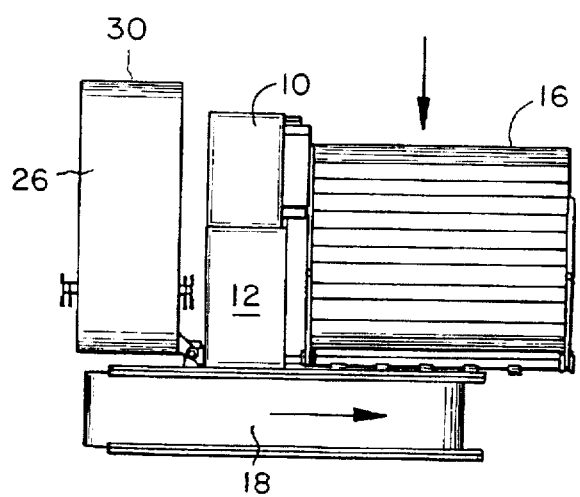
FIG. 5 is a top view showing the cross conveyor side shifted for windrow turning and the discharge conveyor rotated to the side.

Mounted on the left side of the unit on supporting structure 24 is a discharge conveyor 26. Discharge conveyor 26 is also preferably of the belt type powered by a hydraulic motor (not shown). Supporting structure 24 is mounted on a pivot structure 28 that is secured to a portion of the main frame 15 of the machine. Pivot structure 28 includes hydraulic cylinder 36 that powers the swinging movement of the discharge conveyor 26. As best seen in FIGS. 3, 4, and 5, the pivot structure 28 provides for swinging of the discharge conveyor 26 under power of hydraulic cylinder 36 in a horizontal plane to various positions one of which is where the conveyor 26 is positioned with the discharge end 30 forwardly and the conveyor 26 extending along the side of the machine in the general direction and movement of the machine. This position is illustrated in FIG. 5. In this position, the discharge conveyor 26 is out of the way of the cross conveyor 18 and is positioned for transport or for windrow turning.

In FIG. 3, the discharge conveyor 26 is shown in a position swung about pivot structure 28 so that the discharge conveyor 26 is in line with and slightly beneath the left end of the cross conveyor 18. In this position, the discharge end 30 can be elevated by hydraulic cylinders 34 (see FIG. 1) that form a part of the supporting structure 24. In addition, hydraulic cylinder 36 provides for swinging movement of the discharge conveyor to any position from the forward position of FIG. 5 to the transport position shown in FIG. 3. FIG. 4 illustrates the discharge conveyor 26 positioned at an angle of approximately 30° relative to the cross conveyor 18. In this position, the discharge conveyor 26 is properly positioned when the machine is used for stack turning. In this position, the cross conveyor 18 is shifted to the far right position.

The side view of the unit in FIG. 1 shows both the cross conveyor 18 and discharge conveyor 26 in transport positions. For transport purposes, the discharge conveyor 26 is moved to the forward position shown in FIG. 5. As illustrated in FIG. 1, the cross conveyor 18 is raised to a vertical position by pivoting around guide track 20, the pivoting movement being accomplished under control of a hydraulic cylinder 38.

The operation of the apparatus of the invention when used in its different modes is as follows. When the unit is being transported, it is desired that the unit be as compact as possible. FIG. 1 illustrates the unit in the transport mode in which the cross conveyor 18 is pivoted to a vertical position and the discharge conveyor 26 is swung to the full forward position. This facilitates loading and unloading of the unit onto a transport trailer and also facilitates moving of the unit from one site to another either under its own power or towed if the unit is not self-propelled. If the unit is to be used for windrow turning, the discharge conveyor 26 is placed in the full forward or transport position and power to the conveyor 26 is turned off. The cross conveyor 18 is then shifted to the left-most position by powering hydraulic cylinder 22. This windrow turning mode is illustrated in the top view of FIG. 5. In this arrangement, material picked up by the elevator conveyor 16 is discharged onto the cross conveyor 18 which in the windrow turning mode is driven to move the material from left to right as illustrated in FIG. 5.

If the unit is to be used in the stack turning mode, the cross conveyor 18 is shifted to the right-most position by hydraulic cylinder 22, and the cross conveyor 18 is then driven to move material from right to left. In this stack turning mode, the discharge conveyor 26 is swung to the 30° position, and material picked up from an existing stack by the elevator conveyor 16 is discharged onto the cross conveyor 18 from where the material is discharged to form a new stack. The stack turning mode is illustrated in FIG. 4.

If it is desired to load material onto a truck or other carrier, the cross conveyor 18 is shift to the right-most position and powered to move material from right to left. The discharge conveyor 26 is then swung to its 90° position in line with the cross conveyor 18, and the discharge end 32 is elevated. Power to the discharge conveyor is applied so that material picked up by the elevator conveyor 16 will be discharged onto the cross conveyor 18, from where it is moved onto the discharge conveyor 26, elevated and discharged into the truck or other carrier for transport. This loading mode is illustrated in FIG. 3.

In each of the modes illustrated in FIGS. 3, 4 and 5, the loading, stack turning and windrow turning modes, the arrows indicate the direction of movement of the material. The elevator conveyor 16, cross conveyor 18 and discharge conveyor 26 are all independently powered by hydraulic motors (not shown), and a suitable hydraulic system is provided and controlled by an operator from the operator cab 10. The hydraulic system and controls are within the knowledge of those skilled in the art and are not shown.

From the foregoing description of the apparatus of the invention, it is evident that a single compact unit is capable of performing multiple functions, and therefore is a versatile unit that can be used for stack turning, windrow turning or truck loading. Also, the design of the unit is such that the conveyors can be moved into positions to provide a compact unit for transport purposes. Changing from one mode to another can be accomplished with a minimum amount of time from the operator's cab or from a remote location. The unit can be self-propelled and mounted on tracks or rubber tires. In the latter instance, the unit may be designed to be towed rather than self-propelled.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included within the scope of the following claims.

What is claimed is as follows:

1. A material aerating and mixing machine for the bio remediation of material, said machine comprising a supporting frame defining front, rear, and right and left sides of the machine, ground engaging means mounted on the frame to provide for movement of the machine along the ground, a material elevator supported on the frame at the front of the machine which picks up material to be processed from a stack or windrow of the material and elevates, mixes and aerates the material, a cross conveyor supported by the frame in a position to receive material discharged from the material elevator, the cross conveyor extending generally in a direction from side to side of the machine, means for shifting the cross conveyor from a first position toward the right side of the machine as viewed from the rear for stock turning or truck loading to a second position toward the left side of the machine as viewed from the rear for windrow turning, a discharge conveyor pivotally mounted on the frame on the left side of the machine as viewed from the rear for swingable movement about a generally vertical pivot from a first position generally transverse to the direction of movement of the machine and in line with the cross conveyor to receive material discharged from the cross conveyor for truck loading to a second position at an angle in which the discharge conveyor extends forwardly and outwardly from the left side of the machine to receive material discharged from the cross conveyor for stack turning, the discharge conveyor also being moveable to a third position where the discharge conveyor is positioned along the left side of the machine as viewed from the rear during windrow turning and during transport, and means for independently driving the cross conveyor and discharge conveyor and for driving the cross conveyor in either direction so as to move material from right to left or left to right of the machine as viewed from the rear.

2. The material aerating and mixing machine of claim 1 in which the cross conveyor is driven to move material from left to right of the machine as viewed from the rear and the discharge conveyor is idle during the windrow turning mode.

3. The material aerating and mixing machine of claim 1 in which the cross conveyor is driven to move material from right to left of the machine as viewed from the rear and the discharge conveyor is positioned in the second position during the stack turning mode.

4. The material aerating and mixing machine of claim 1 in which the cross conveyor is driven to move material from right to left of the machine as viewed from the rear and the discharge conveyor is positioned in the first position during the truck loading mode.

5. The material and aerating and mixing machine of claim 1 in which means is provided to pivot the cross conveyor upwardly along a generally horizontal axis to a generally vertical position whereby the cross conveyor can be moved to a transport position.

6. The material and aerating and mixing machine of claim 4 wherein the discharge conveyor has a discharge end and in which means is provided to elevate the discharge end during the truck loading mode.

7. The material aerating and mixing machine of claim 1 in which the ground engaging means are tracks supported by the frame, and means is provided to propel the machine.

8. The material and aerating and mixing machine of claim 1 in which the cross conveyor and the discharge conveyor are belt conveyors.

* * * * *